(12) United States Patent
Andersen et al.

(10) Patent No.: US 7,802,028 B2
(45) Date of Patent: Sep. 21, 2010

(54) TOTAL DYNAMIC SHARING OF A TRANSACTION QUEUE

(75) Inventors: Erik Andersen, Mountain View, CA (US); Weitong Chuang, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 375 days.

(21) Appl. No.: 11/258,124

(22) Filed: Oct. 26, 2005

(65) Prior Publication Data

US 2006/0248242 A1 Nov. 2, 2006

Related U.S. Application Data

(60) Provisional application No. 60/676,287, filed on May 2, 2005.

(51) Int. Cl.
*G06F 3/00* (2006.01)

(52) U.S. Cl. ............... 710/36; 710/34; 710/52; 370/229

(58) Field of Classification Search ............ 710/52; 370/381, 412, 230, 235, 236, 346, 389, 390, 370/395, 413, 414, 428, 463; 708/402; 709/213; 719/312

See application file for complete search history.

(56) References Cited

U.S. PATENT DOCUMENTS

| 5,896,322 | A * | 4/1999 | Ishii .................. 365/189.04 |
| 6,195,674 | B1 * | 2/2001 | Elbourne et al. ............ 708/402 |
| 6,590,901 | B1 * | 7/2003 | Jones ..................... 370/428 |
| 6,717,576 | B1 * | 4/2004 | Duluk et al. ............... 345/419 |
| 6,741,559 | B1 * | 5/2004 | Smeulders et al. .......... 370/230 |
| 6,778,546 | B1 * | 8/2004 | Epps et al. ................. 370/413 |
| 6,788,697 | B1 * | 9/2004 | Aweya et al. .............. 370/412 |
| 6,961,342 | B1 * | 11/2005 | Uzun et al. ................. 370/414 |
| 6,999,416 | B2 * | 2/2006 | Wang et al. ................. 370/230 |
| 7,002,980 | B1 * | 2/2006 | Brewer et al. .............. 370/414 |
| 7,031,331 | B2 * | 4/2006 | Schaub .................... 370/412 |
| 7,061,909 | B2 * | 6/2006 | Blanc et al. ................ 370/390 |
| 7,088,730 | B2 * | 8/2006 | Hsu et al. .................. 370/412 |
| 7,349,416 | B2 * | 3/2008 | Jacobs et al. .............. 370/412 |
| 7,529,252 | B2 * | 5/2009 | Andersen ................ 370/395.7 |
| 7,558,270 | B1 * | 7/2009 | Wilford et al. .......... 370/395.42 |
| 7,606,231 | B2 * | 10/2009 | Smith et al. ................ 370/392 |
| 2002/0039350 | A1 | 4/2002 | Wang et al. |

(Continued)

FOREIGN PATENT DOCUMENTS

EP 1217794 6/2002

OTHER PUBLICATIONS

Leon-Garcia et al., Communication Networks, McGraw-Hill, 2004, pp. 539-548.*

*Primary Examiner*—Henry W Tsai
*Assistant Examiner*—Cheng-Yuan Tseng

(57) ABSTRACT

A network device for dynamically allocating memory locations to plurality of queues. The network device includes an assigning means for assigning a predefined amount of a temporary memory buffer and a shared memory buffer to each of a plurality of ports and for allocating a fixed allocation of the temporary memory buffer and the shared memory buffer to each of a plurality of queues associated with each port. After each queue has accumulated a predefined portion of data in the temporary memory buffer, the data is transmitted to the shared memory. The means for assigning reduces the shared memory access bandwidth by a predefined amount that is less than a processing bandwidth of a system clock.

17 Claims, 4 Drawing Sheets

U.S. PATENT DOCUMENTS

| | | | |
|---|---|---|---|
| 2004/0001487 A1* | 1/2004 | Tucker et al. | 370/389 |
| 2004/0004972 A1* | 1/2004 | Lakshmanamurthy et al. | 370/413 |
| 2004/0196859 A1* | 10/2004 | Benner | 370/413 |
| 2004/0264374 A1* | 12/2004 | Yu et al. | 370/230 |
| 2004/0264464 A1* | 12/2004 | Wong | 370/390 |
| 2005/0002371 A1* | 1/2005 | Andersen | 370/346 |
| 2005/0036502 A1* | 2/2005 | Blanc et al. | 370/412 |
| 2006/0221945 A1* | 10/2006 | Chin et al. | 370/381 |

* cited by examiner

TOTAL DYNAMIC SHARING OF A TRANSACTION QUEUE

This application claims priority of U.S. Provisional Patent Application Ser. No. 60/676,287, filed on May 2, 2005. The subject matter of this earlier filed application is hereby incorporated by reference.

BACKGROUND OF THE INVENTION

1. Field of the Invention

The present invention relates to a network device in a packet switched network and more particularly to a method of dynamically sharing a memory location across all of the ports associated with the network device without a total bandwidth exceeding that of a system clock.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As packets enter the device from multiple ports, they are forwarded to the ingress module where switching and other processing are performed on the packets. Thereafter, the packets are transmitted to one or more destination ports through the MMU and the egress module. The MMU enables sharing of packet buffer among different ports while providing resource guarantees for every ingress port, egress port and class of service queue. According to a current switching system architecture, eight class of service queues are associated with each port. To ensure bandwidth guarantees across the ports and queues, the device allocates a fixed portion of the memory for the port to each queue. As such, a queue that is associated with a class of service with a high priority may be assigned a greater fixed portion than a queue that is associated with a lower priority class of service. This implementation is inflexible and does not account for dynamic requirements that may be associated with one or more queues.

A more flexible approach defines a guaranteed fixed allocation of memory for each class of service queue by specifying how many buffer entries should be reserved for an associated queue. For example, if 100 bytes of memory are assigned to a port, the first four classes of service queues initially may be assigned the value of 10 bytes and the last four queues initially may be assigned the value of 5 bytes. Even if a queue does not use up all of the initially reserved entries, the unused buffers may not be assigned to another queue. Nevertheless, the remaining unassigned 40 bytes of memory for the port may be shared among all of the class of service queues associated with the port. Limits on how much of the shared pool of the memory may be consumed by a particular class of service queue are set by a limit threshold. As such, the limit threshold may be used to define the maximum number of buffers that can be used by one queue and to prevent one queue from using all of the available memory buffers. To ensure that the sum of initial assigned memory values do not add up to more than the total number of available memory for the port and to ensure that each class of service queue has access to its initially assigned quota of memory, the available pool of memory for each port is tracked using a port dynamic count register, wherein the dynamic count register keeps track of the number of available shared memory for the port. The initial value of the dynamic count register is the total number of memory associated with the port minus a sum of the initial assigned memory buffers. The dynamic count register is decremented when a class of service queue uses an available memory after the class of service queue has exceeded its initially assigned quota. Conversely, the dynamic count register is incremented when a class of service queue releases a memory after the class of service queue has exceeded its quota as initially assigned.

In a current device, the total of 56 K entries of memory is shared among all ports and all class of service queues. In a worst case scenario, all ports may multicast 64 bytes multicast packet to all other port, including the sending port. Therefore, for each 1G port, the maximum ingress data packet rate is 1.4881 mega packet per second (Mpps) since (1Gbps/((64 byte+12 byte+8 byte)*8bits/byte)) is equal to 1.4881M~1.5M, wherein 12 bytes are used for an Inter Packet Gap and 8 bytes are used for a preamble. As such, each port will receive 36.75 Mpps~36.8 Mpps. In a device where there are 14 ports, the aggregate bandwidth requirement is 36.75 *14 or 514.4 MHz. This bandwidth requirement is three times faster than a typical system clock of 156 MHz. As such, the device will be unable to support such high bandwidth demand.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
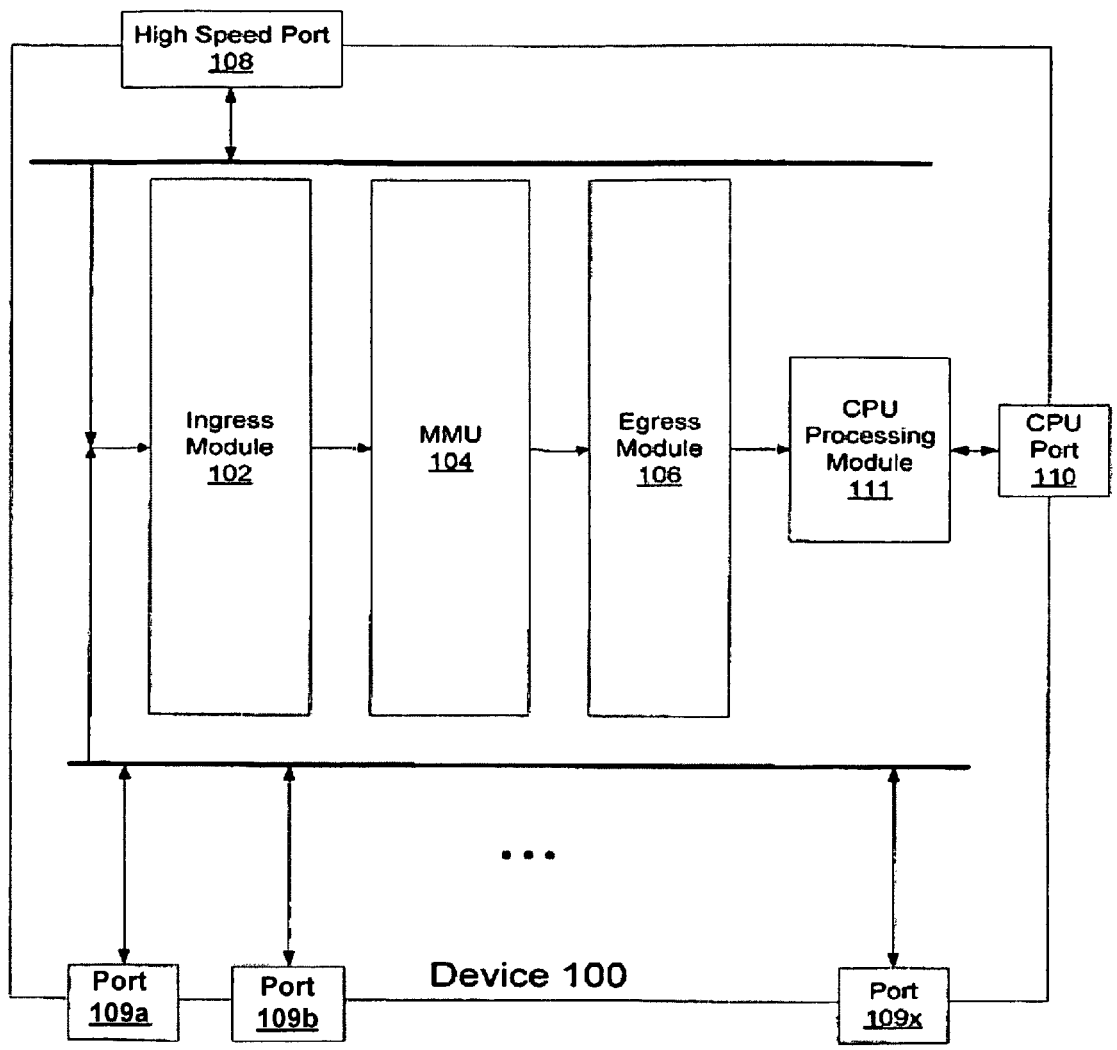
FIG. 1 illustrates a network device in which an embodiment of the present invention may be implemented.

FIG. 1 illustrates a network device, such as a switching chip, in which an embodiment of the present invention may be implemented. Device 100 includes an ingress module 102, a MMU 104, and an egress module 106. Ingress module 102 is used for performing switching functionality on an incoming packet. The primary function of MMU 104 is to efficiently manage cell buffering and packet pointer resources in a predictable manner even under severe congestion scenarios.

Egress module 106 is used for performing packet modification and transmitting the packet to an appropriate destination port.

Device 100 may also include one internal fabric high speed port, for example a HiGig port, 108, one or more external Ethernet ports 109a-109x, and a CPU port 110. High speed port 108 is used to interconnect various network devices in a system and thus form an internal switching fabric for transporting packets between external source ports and one or more external destination ports. As such, high speed port 108 is not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports. In one embodiment of the invention, device 100 supports twelve physical Ethernet ports 109, each of which can operate in 10/100/1000 Mbps speed and one high speed port 108 which operates in either 10 Gbps or 12 Gbps speed.

Figure 2A:
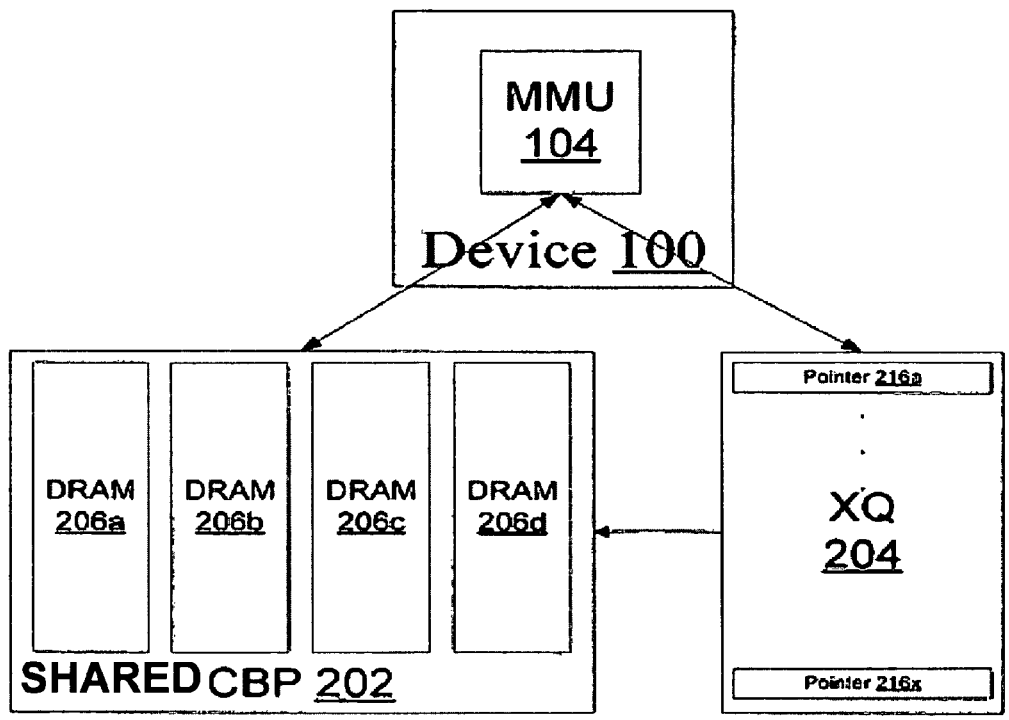
FIG. 2a illustrates the shared memory architecture of the present invention.
Figure 2B:
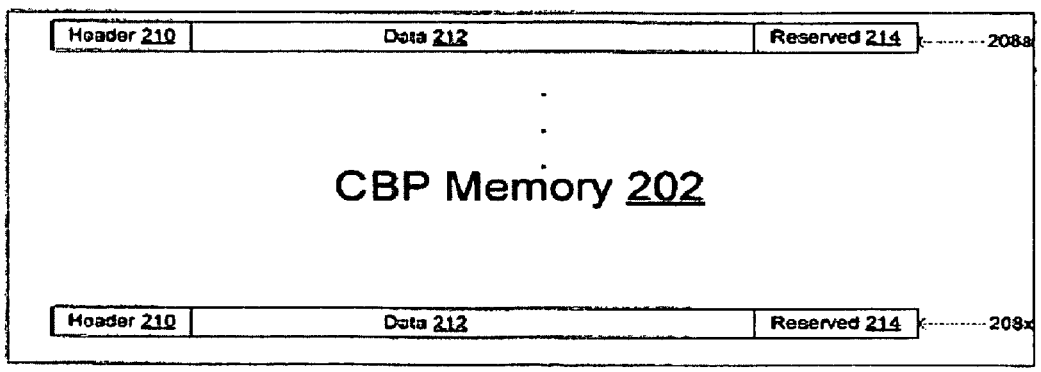
FIG. 2b illustrates the Cell Buffer Pool of the shared memory architecture.

In an embodiment of the invention, device 100 is built around a shared memory architecture, as shown in FIGS. 2a-2b wherein MMU 104 enables sharing of a shared packet memory buffer among different ports while providing for resource guarantees for every ingress port, egress port and class of service queue associated with each egress port. FIG. 2a illustrates the shared memory architecture of the present invention. Specifically, the memory resources of device 100 include a shared Cell Buffer Pool (CBP) memory 202 and a Transaction Queue (XQ) memory 204. CBP memory 202 is an off-chip resource that is made of 4 DRAM chips 206a-206d. According to an embodiment of the invention, each DRAM chip has a capacity of 288 Mbits, wherein the total capacity of CBP memory 202 is 144 Mbytes of raw storage. As shown in FIG. 2b, CBP memory 202 is divided into 256K 576-byte cells 208a-208x, each of which includes a 32 byte header buffer 210, up to 512 bytes for packet data 212 and 32 bytes of reserved space 214. As such, each incoming packet consumes at least one full 576 byte cell 208. Therefore in an example where an incoming packet includes a 64 byte frame, the incoming packet will have 576 bytes reserved for it even though only 64 bytes of the 576 bytes is used by the frame.

Returning to FIG. 2a, XQ memory 204 includes a list of packet pointers 216a-216x into CBP memory 202, wherein different XQ pointers 216 may be associated with each port. A cell count of CBP memory 202 and a packet count of XQ memory 204 is tracked on an ingress port, egress port and class of service basis. As such, device 100 can provide resource guarantees on a cell and/or packet basis.

Figure 3:
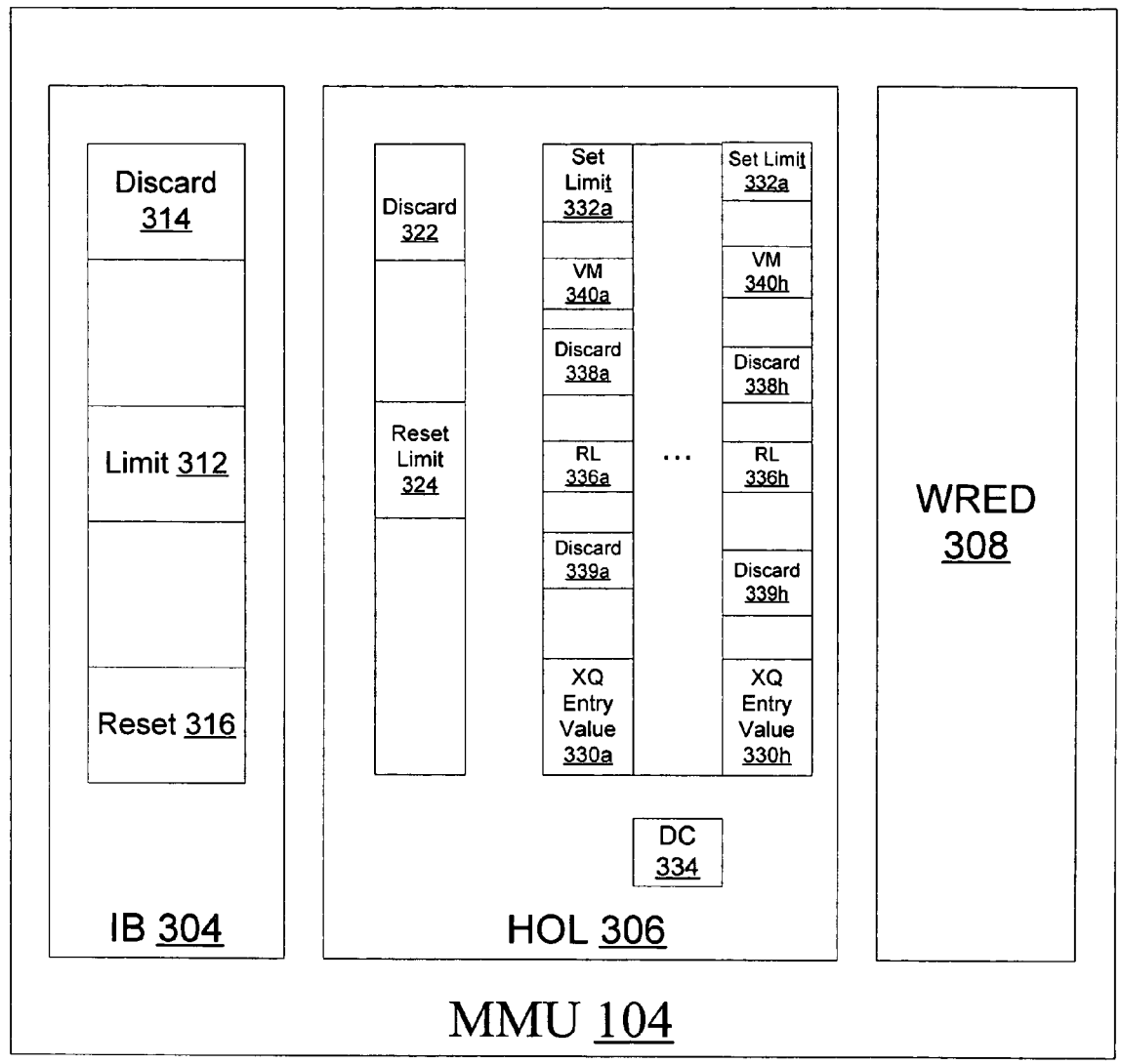
FIG. 3 illustrates buffer management mechanisms that are used by the memory management unit to impose resource allocation limitations and thereby ensure fair access to resource.

Once a packet enters device 100 on a source port 109, the packet is transmitted to ingress module 102 for processing. During processing, packets on each of the ingress and egress ports share system resources 202 and 204. FIG. 3 illustrates buffer management mechanisms that are used by MMU 104 to impose resource allocation limitations and thereby ensure fair access to resources. MMU 104 includes an ingress backpressure mechanism 304, a head of line mechanism 306 and a weighted random early detection mechanism 308. Ingress backpressure mechanism 304 supports lossless behaviour and manages buffer resources fairly across ingress ports. Head of line mechanism 306 supports access to buffering resources while optimizing throughput in the system. Weighted random early detection mechanism 308 improves overall network throughput.

Ingress backpressure mechanism 304 uses packet or cell counters to track the number of packets or cells used on an ingress port basis. Ingress backpressure mechanism 304 includes registers for a set of 8 individually configurable thresholds and registers used to specify which of the 8 thresholds are to be used for every ingress port in the system. The set of thresholds include a limit threshold 312, a discard limit threshold 314 and a reset limit threshold 316. If a counter associated with the ingress port packet/cell usage rises above discard limit threshold 314, packets at the ingress port will be dropped. Based on the counters for tracking the number of cells/packets, a pause flow control is used to stop traffic from arriving on an ingress port that have used more than its fair share of buffering resources, thereby stopping traffic from an offending ingress port and relieving congestion caused by the offending ingress port. Specifically, each ingress port keeps track of whether or not it is in an ingress backpressure state based on ingress backpressure counters relative to the set of thresholds. When the ingress port is in ingress backpressure state, pause flow control frames with a timer value of (0xFFFF) are periodically sent out of that ingress port. When the ingress port is no longer in the ingress backpressure state, the pause flow control frame with a timer value of 0x00 is sent out of the ingress port and traffic is allowed to flow again. If an ingress port is not currently in an ingress backpressure state and the packet counter rises above limit threshold 312, the status for the ingress port transitions into the ingress backpressure state. If the ingress port is in the ingress backpressure state and the packet counter falls below reset limit threshold 316, the status for the port will transition out of the backpressure state.

Head of line mechanism 306 is provided to support fair access to buffering resources while optimizing throughput in the system. Head of line mechanism 306 relies on packet dropping to manage buffering resources and improve the overall system throughput. According to an embodiment of the invention, head of line mechanism 306 uses egress counters and predefined thresholds to track buffer usage on a egress port and class of service basis and thereafter makes decisions to drop any newly arriving packets on the ingress ports destined to a particular oversubscribed egress port/class of service queue. Head of line mechanism 306 supports different thresholds depending on the color of the newly arriving packet. Packets may be colored based on metering and marking operations that take place in the ingress module and the MMU acts on these packets differently depending on the color of the packet.

According to an embodiment of the invention, head of line mechanism 306 is configurable and operates independently on every class of service queue and across all ports, including the CPU port. Head of line mechanism 306 uses counters that track XQ memory 204 and CBP memory 202 usage and thresholds that are designed to support a static allocation of CBP memory buffers 202 and dynamic allocation of the available XQ memory buffers 204. A discard threshold 322 is defined for all cells in CBP memory 202, regardless of color marking. When the cell counter associated with a port reaches discard threshold 322, the port is transitioned to a head of line status. Thereafter, the port may transition out of the head of line status if its cell counter falls below a reset limit threshold 324.

For the XQ memory 204, a guaranteed fixed allocation of XQ buffers for each class of service queue is defined by a XQ entry value 330a-330h. Each of XQ entry value 330a-330h defines how many buffer entries should be reserved for an associated queue. For example, if 100 bytes of XQ memory are assigned to a port, the first four class of service queues associated with XQ entries 330a-330d respectively may be assigned the value of 10 bytes and the last four queues associated with XQ entries 330d-330h respectively may be assigned the value of 5 bytes. According to an embodiment of the invention, even if a queue does not use up all of the buffer entries reserved for it according to the associated XQ entry value, head of line mechanism 306 may not assign the unused buffer to another queue. Nevertheless, the remaining unassigned 40 bytes of XQ buffers for the port may be shared among all of the class of service queues associated with the port. Limits on how much of the shared pool of the XQ buffers may be consumed by a particular class of service queue is set with a XQ set limit threshold 332. As such, set limit threshold 332 may be used to define the maximum number of buffers that can be used by one queue and to prevent one queue from using all of the available XQ buffers. To ensure that the sum of XQ entry values 330a-330h do not add up to more than the total number of available XQ buffers for the port and to ensure that each class of service queue has access to its quota of XQ buffers as assigned by its entry value 330, the available pool of XQ buffers for each port is tracked using a port dynamic count register 334, wherein dynamic count register 334 keeps track of the number of available shared XQ buffers for the port. The initial value of dynamic count register 334 is the total number of XQ buffers associated with the port minus a sum of the number of XQ entry values 320a-320h. Dynamic count register 334 is decremented when a class of service queue uses an available XQ buffer after the class of service queue has exceeded its quota as assigned by its XQ entry value 330. Conversely, dynamic count register 334 is incremented when a class of service queue releases a XQ buffer after the class of service queue has exceeded its quota as assigned by its XQ entry value 330.

When a queue requests XQ buffer 204, head of line mechanism 306 determines if all entries used by the queue are less than the XQ entry value 330 for the queue and grants the buffer request if the used entries are less than the XQ entry value 330. If however, the used entries are greater than the XQ entry value 330 for the queue, head of line mechanism 306 determines if the amount requested is less than the total available buffer or less then the maximum amount set for the queue by the associated set limit threshold 332. Set limit threshold 332 is in essence a discard threshold that is associated with the queue, regardless of the color marking of the packet. As such, when the packet count associated with the packet reaches set limit threshold 332, the queue/port enters into a head of line status. When head of line mechanism 306 detects a head of line condition, it sends an update status so that ingress module 102 can drop packets on the congested port. However, due to latency, there may be packets in transition between ingress module 102 and MMU 104 when the status update is sent by head of line mechanism 306. In this case, the packet drops may occur at MMU 104 due to the head of line status. In an embodiment of the invention, due to the pipeline of packets between ingress module 102 and MMU 104, the dynamic pool of XQ pointers is reduced by a predefined amount. As such, when the number of available XQ pointers is equal to or less than the predefined amount, the port is transition to the head of line status and an update status is sent to by MMU 104 to ingress module 102, thereby reducing the number of packets that may be dropped by MMU 104. To transition out of the head of line status, the XQ packet count for the queue must fall below a reset limit threshold 336.

It is possible for the XQ counter for a particular class of service queue to not reach set limit threshold 332 and still have its packet dropped if the XQ resources for the port are oversubscribed by the other class of service queues. In an embodiment of the invention, intermediate discard thresholds 338 and 339 may also be defined for packets containing specific color markings, wherein each intermediate discard threshold defines when packets of a particular color should be dropped. For example, intermediate discard threshold 338 may be used to define when packets that are colored yellow should be dropped and intermediate discard threshold 339 may be used to define when packets that are colored red should be dropped. According to an embodiment of the invention, packets may be colored one of green, yellow or red depending on the priority level assigned to the packet. To ensure that packets associated with each color are processed in proportion to the color assignment in each queue, one embodiment of the present invention includes a virtual maximum threshold 340. Virtual maximum threshold 340 is equal to the number of unassigned and available buffers divided by the sum of the number of queues and the number of currently used buffers. Virtual maximum threshold 340 ensures that the packets associated with each color are processed in a relative proportion. Therefore, if the number of available unassigned buffers is less than the set limit threshold 332 for a particular queue and the queue requests access to all of the available unassigned buffers, head of line mechanism 306 calculates the virtual maximum threshold 340 for the queue and processes a proportional amount of packets associated with each color relative to the defined ratios for each color.

To conserve register space, the XQ thresholds may be expressed in a compressed form, wherein each unit represents a group of XQ entries. The group size is dependent upon the number of XQ buffers that are associated with a particular egress port/class of service queue.

Weighted random early detection mechanism 308 is a queue management mechanism that pre-emptively drops packets based on a probabilistic algorithm before XQ buffers 204 are exhausted. Weighted random early detection mechanism 308 is therefore used to optimize the overall network throughput. Weighted random early detection mechanism 308 includes an averaging statistic that is used to track each queue length and drop packets based on a drop profile defined for the queue. The drop profile defines a drop probability given a specific average queue size. According to an embodiment of the invention, weighted random early detection mechanism 308 may defined separate profiles on based on a class of service queue and packet.

Figure 4:
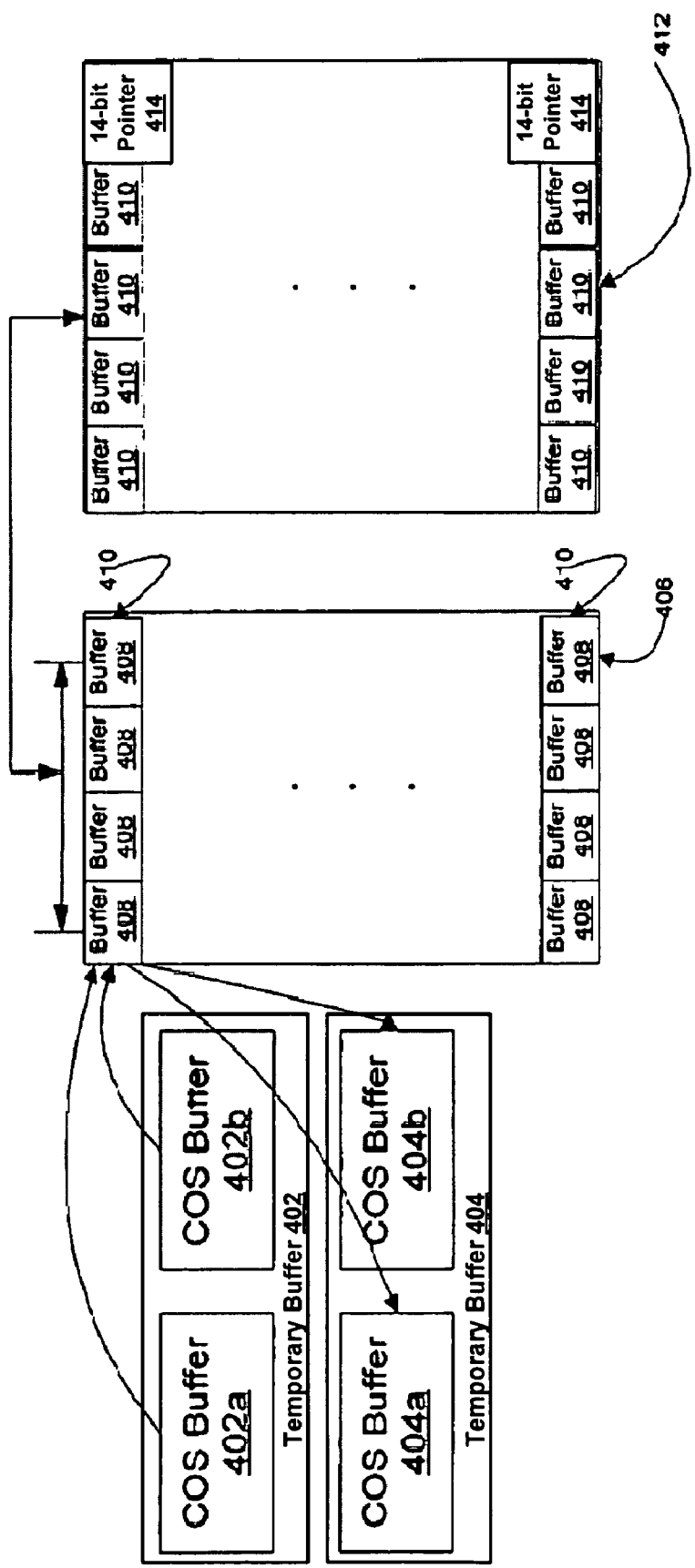
FIG. 4 illustrates how one XQ memory 204 is dynamically shared among all ports in a network device.

FIG. 4 illustrates another embodiment of how one XQ memory 204 is dynamically shared among all ports. According to FIG. 4, each class of service is allocated four words of buffer 402 and 404, two buffers 402a-402b are used to temporarily store XQ data before writing to XQ memory 204 and two buffers 404a and 404b are used to temporarily store XQ data that is read from XQ memory 204. Therefore, as new XQ entries arrive at a particular class of service for a port while packet data is being transferred to or from XQ memory 204, there will exist extra space for storing the incoming data. Similarly during egress, one word is used to store a prefetched word before a port has consumed all the XQ entries stored in the other word. This guarantees that an XQ dequeuing operation is not interrupted. During ingress processing, after each class of service has accumulated one word/four entries of XQ data, the data is transferred to XQ memory 204.

As shown by temporary memory buffer 406, each port is capable of storing four XQ entries 408 for each class of service in one word 410. Each port is also able to write the four stored XQ entries 408 at one memory access in XQ memory 204. On the egress side, each port is also capable of reading four XQ entries 406 at a time from XQ memory. According to one embodiment of the invention, each XQ entry 408 has 35 bits of data. The size of each ports' temporary buffer as shown by 412 is thus 140 bit/word multiplied by four words per class of service and multiplied by eight classes of service per port or 140 bits/word multiplied by 32 words/ port. By storing four XQ entries 408 into one word 410, temporary port buffer 412 is thus capable of storing 154 bits in each entry, i.e., four words 410, each of which includes four XQ entries 408, plus a 14-bit pointer 414 that is required for 14K words. This effectively reduces the memory access bandwidth requirement for a device with 12 1G ports, a high speed port and a CPU port by one fourth.

In an embodiment of the invention where a total of 56 K entries of XQ memory 204 is shared among all ports and all class of service queues, all ports may multicast 64 bytes multicast packet to all port, including the sending port.

Therefore, for each 1G port, the maximum ingress data packet rate is 1.4881 Mpps, or approximately 1.5 Mpps. As such, each port will receive 36.75 Mpps, i.e., (1.5×24.5). For write access, the bandwidth requirement is therefore 128.7 MHz or 36.75/4*14, wherein 14 is the total number of engress ports, a CPU port and a high speed port. For read access the bandwidth is 9.2 MHz or 1.5/4*24.5, wherein 24.5 represent the total number of ports. Consequently, the total memory access to XQ memory 204 is 128.7+9.2 or 137.9 MHz, which is smaller than the typical system clock of 156 MHz.

When a queue requests XQ buffer 204, and head of line mechanism 306 detects a head of line condition, it sends an update status so that ingress module 102 can drop packets on the congested port. However, due to latency, there may be packets in transition between ingress module 102 and MMU 104 when the status update is sent by head of line mechanism 306. In this case, the packet drops may occur at MMU 104 due to the head of line status.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for dynamically allocating memory locations to a plurality of queues, the network device comprising:
    assigning means for assigning respective portions of a temporary memory buffer to each of a plurality of ports and assigning respective portions of a shared memory buffer to each of the plurality of ports; and
    allocating means for allocating respective fixed allocations of the respective portions of the temporary memory buffer assigned to each of the plurality of ports to each of the plurality of queues associated with each port and allocating respective fixed allocations of the respective portions of the shared memory buffer assigned to each of the plurality of ports to each of the plurality of queues associated with each port,
    wherein after each queue has accumulated a predefined amount of data for a respective class of service in the temporary memory buffer, the data for the respective class of service is transmitted from the temporary memory buffer to the shared memory buffer based on at least:
        an ingress backpressure mechanism tracking a number of packets from the plurality of ports; and
        a head of line mechanism tracking:
            usage of the shared memory buffer using respective first counters in accordance with one or more static thresholds; and
            usage of the temporary buffer using respective second counters in accordance with one or more dynamic thresholds and one more entry values; and
        a weighted random early detection algorithm,
    such that the allocating means reduces a shared memory buffer access bandwidth of the shared memory buffer by a predefined amount that is less than a processing bandwidth of a system clock.

2. The network device according to claim 1, wherein the allocating means, for the respective class of service, allocates four words of the temporary memory buffer to each of the plurality of queues and thereby reduces the shared memory buffer access bandwidth by a fourth of a total of the shared memory buffer access bandwidth.

3. The network device according to claim 2, wherein the allocating means allocates two of the four words for temporarily storing data before the data is written to the shared memory and two of the four words for temporarily storing data that is read from the shared memory.

4. The network device according to claim 1, wherein for each port, the temporary memory buffer stores four entries for each queue in one word, wherein each queue writes one word to the shared memory buffer at one memory access and reads one word from the shared memory buffer at each memory read.

5. The network device according to claim 4, wherein each of the four entries stores 35 bits of data.

6. The network device according to claim 1, wherein the temporary memory buffer for each port stores four words for each of the plurality of queues and a 14 bit pointer for each of the plurality of queues.

7. The network device according to claim 1, wherein the allocating means reduces the shared memory buffer access bandwidth by at least one fourth of a total of the shared memory buffer bandwidth requirement.

8. A method for dynamically allocating memory locations to plurality of queues, the method comprising:
    assigning respective portions of a temporary memory buffer to each of a plurality of ports;
    assigning respective portions of a shared memory buffer to each of the plurality of ports;
    allocating respective fixed allocations of the respective portions of the temporary memory buffer assigned to each of the plurality of ports to each of the plurality of queues associated with each port;
    allocating respective fixed allocations of the respective portions of the shared memory buffer assigned to each of the plurality of ports to each of the plurality of queues associated with each port;
    transmitting data from the temporary memory buffer to the shared memory buffer after each queue has accumulated a predefined amount of data for a respective class of service in the temporary memory buffer based on at least:
        an ingress backpressure mechanism tracking a number of packets from the plurality of ports; and
        a head of line mechanism tracking:
            usage of the shared memory buffer using respective first counters in accordance with one or more static thresholds; and usage of the temporary buffer using respective second counters in accordance with one or more dynamic thresholds and one more entry values; and a weighted random early detection algorithm, such that a shared memory access buffer bandwidth of the shared memory buffer is reduced by a predefined amount that is less than a processing bandwidth of a system clock.

9. The method according to claim 8, further comprising allocating, for the respective class of service, four words of the temporary memory buffer to each queue to thereby reduce the shared memory buffer access bandwidth by a fourth of a total of the shared memory buffer access bandwidth.

10. The method according to claim 8, further comprising allocating two buffers for temporarily storing data of the respective class of service before the data is written to the shared memory buffer and two buffers for temporarily storing data of the respective class of service that is read from the shared memory buffer.

11. The method according to claim 8, further comprising writing, by each queue, one word to the shared memory buffer at one memory access and reading one word from the shared memory buffer at each memory read.

12. The method according to claim 8, further comprising storing 35 bits of data in each of four entries associated with each queue.

13. The method according to claim 8, further comprising storing in the temporary memory buffer, for each port, four words for each of the plurality of queues and a 14 bit pointer for each of the plurality of queues.

14. An apparatus for dynamically allocating memory locations to a plurality of queues, the apparatus comprising:

an assignment unit configured to assign respective portions of a temporary memory buffer to each of a plurality of ports and assign respective portions of a shared memory buffer to each of the plurality of ports;

an allocating unit configured to allocate a respective fixed allocation of the respective portions of the temporary memory buffer assigned to each of the plurality of ports to each of a plurality of queues associated with each port and allocate a respective fixed allocation of the respective portions of the shared memory buffer assigned to each of the plurality of ports to each of a plurality of queues associated with each port; and a transmitter configured to transmit data from the temporary memory buffer to the shared memory buffer after each queue has accumulated a predefined amount of data for a respective class of service in the temporary memory buffer based on at least:

an ingress backpressure mechanism tracking a number of packets from the plurality of ports, and a head of line mechanism tracking:

usage of the shared memory buffer using respective first counters in accordance with one or more static thresholds; and usage of the temporary buffer using respective second counters in accordance with one or more dynamic thresholds and one more entry values; and a weighted random early detection algorithm, wherein the allocating unit is further configured to reduce a shared memory buffer access bandwidth of the shared memory buffer by a predefined amount that is less than a processing bandwidth of a system clock.

15. An apparatus for dynamically allocating memory locations to a plurality of queues, the apparatus comprising:

an assigning unit configured to assign respective portions of a temporary memory buffer to each of a plurality of ports and assign respective portions of a shared memory buffer to each of the plurality of ports;

an allocating unit configured to allocate a respective fixed allocation of the respective portions of the temporary memory buffer assigned to each of the plurality of ports to each of a plurality of queues associated with each port and allocate a respective fixed allocation of the respective portions of the shared memory buffer assigned to each of the plurality of ports to each of a plurality of queues associated with each port; and a transmitter configured to transmit data from the temporary memory buffer to the shared memory buffer after each queue has accumulated a predefined amount of data for a respective class of service in the temporary memory buffer based on at least:

an ingress backpressure mechanism tracking a number of packets from the plurality of ports, and a head of line mechanism tracking:

usage of the shared memory buffer using respective first counters in accordance with one or more static thresholds; and usage of the temporary buffer using respective second counters in accordance with one or more dynamic thresholds and one more entry values; and a weighted random early detection algorithm, wherein the allocating unit is further configured to reduce a shared memory buffer access bandwidth of the shared memory buffer by a predefined amount that is less than a processing bandwidth of a system clock.

16. The network device according to claim 1, wherein the ingress backpressure mechanism further comprises threshold registers.

17. The network device according to claim 1, wherein the head of line mechanism further operates based on discard threshold values and/or virtual maximum threshold values.

* * * * *